United States Patent [19]

Molinatto

[11] Patent Number: 4,510,865
[45] Date of Patent: Apr. 16, 1985

[54] GRAVURE PRESSURE ROLLERS WITH AXIS OF VARIABLE SHAPE

[75] Inventor: Bruno Molinatto, Turin, Italy

[73] Assignee: Componenti Grafici S.r.l., Turin, Italy

[21] Appl. No.: 469,526

[22] Filed: Feb. 24, 1983

[30] Foreign Application Priority Data

Mar. 3, 1982 [IT] Italy ............... 67238 A/82

[51] Int. Cl.³ .............................................. B41F 9/00
[52] U.S. Cl. .................................. 101/153; 101/375; 29/116 AD
[58] Field of Search ............... 101/152, 153, 375, 376; 29/113 AD, 116 AD

[56] References Cited

U.S. PATENT DOCUMENTS

| 1,358,843 | 11/1920 | Grass | 101/375 |
| 2,583,889 | 1/1952 | Schoonenberg | 101/375 |
| 3,638,292 | 2/1972 | Gaghan | 29/113 AD |

FOREIGN PATENT DOCUMENTS

| 2742002 | 3/1979 | Fed. Rep. of Germany | 101/376 |
| 1481346 | 4/1967 | France | 29/116 AD |
| 402005 | 5/1966 | Switzerland | 101/375 |
| 893426 | 4/1962 | United Kingdom | 29/113 AD |
| 337456 | 5/1972 | U.S.S.R. | 29/116 AD |

Primary Examiner—Edgar S. Burr
Assistant Examiner—John A. Weresh
Attorney, Agent, or Firm—Roylance, Abrams, Berdo & Goodman

[57] ABSTRACT

A gravure pressure roller with an axis of variable shape, in which the outer jacket (2), rotated coaxially to and inside the jacket (2) of the roller by the shaft (3), is supported at its ends by bearings (10) and at the mid-part by levers (21) coupled in an articulated manner to the mid-part of the shaft (3), so as to be in contact with the inner surface (7) of the jacket (2), contacting the same with the intercalation of bearings (22) and actuators (15) inserted between the shaft (3) and each lever (21).

14 Claims, 1 Drawing Figure

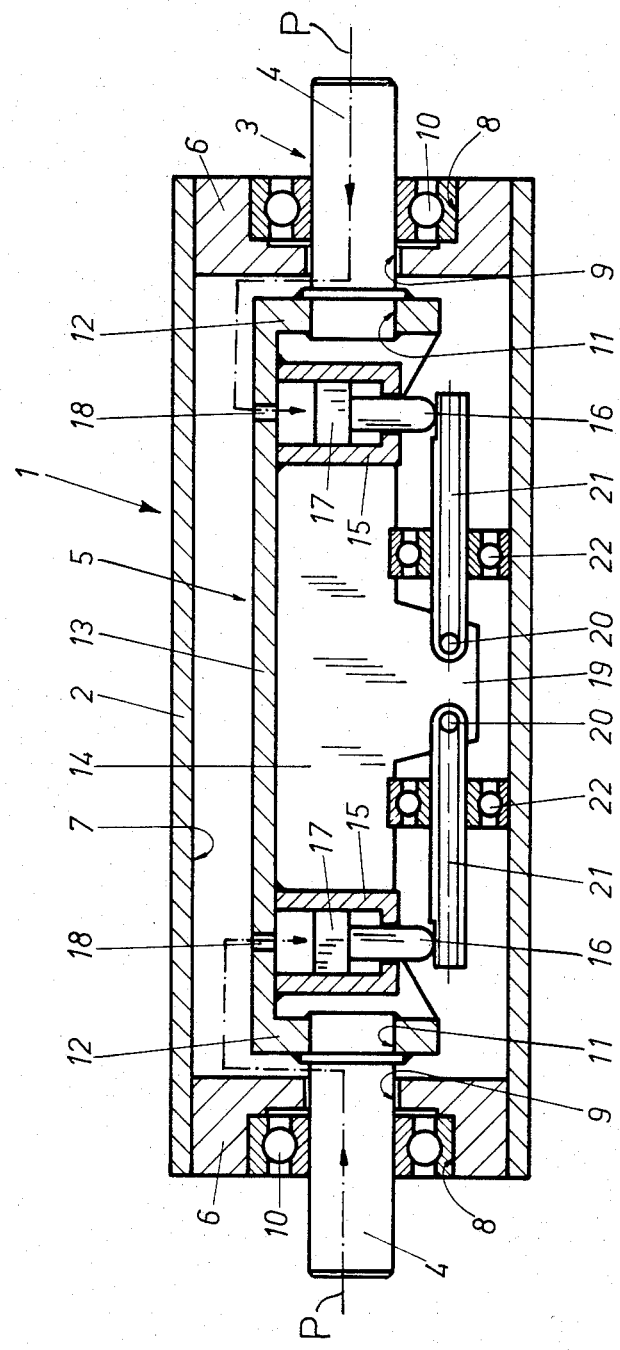

GRAVURE PRESSURE ROLLERS WITH AXIS OF VARIABLE SHAPE

FIELD OF THE INVENTION

This invention relates to a gravure pressure roller with an axis of variable shape.

In particular, this invention relates to gravure pressure rollers, in which a pressure roller is used in contact with a mobile supporting surface, in particular a cylindrical supporting surface, for ensuring onto the latter a given, substantially uniformly distributed pressure along the contact line.

BACKGROUND OF THE INVENTION

This invention is preferably used for relatively long pressure rollers, in which the dead load of the roller as well as the effect of the said contact surfaces result in general in an imperfect contact between the supporting surfaces and the pressure roller. It ensues therefrom that the contact pressure is not uniformly distributed along the contact line, but tends to vary from point to point of the line according to complicated laws reaching a minimum effect in the midst of the pressure roller. If it is necessary to raise this minimum to a given value, a pressure must be applied to the roller corresponding to a mean pressure value along the jacket line of the roller, rather higher than the value of the said minimum.

SUMMARY OF THE INVENTION

This invention now proposes a pressure roller whose jacket contact line can take a shape resulting to be identical to the deformation of the corresponding supporting surface and being, at the same time, independant of the loads encountered between the said surface and the roller along the said contact line. This purpose is attained by providing the pressure roller with an axis of variable shape, with the said roller being provided with a cylindrical outer jacket, whose opposite ends are rotatingly supported by a central shaft with actuator devices provided inside the mentioned jacket for ensuring a given flexure of the jacket axis, with the said actuator devices being received by the mid-part of the central shaft and being provided with levers, articulated to the mid-part and displaceable around their fulcrum by means of push elements assembled always on the said mid-part, with the displaceable levers being connected through bearings and actuators with the inner jacket surface. Further characteristics and advantages of this invention will become clear from the following description and on hand of the accompanying drawing.

BRIEF DESCRIPTION OF THE DRAWINGS

The accompanying drawing shows an embodiment of the pressure roller according to this invention, in longitudinal section.

DETAILED DESCRIPTION

The drawing shows a pressure roller indicated as such with 1. The pressure roller 1 is provided with an outer cylindrical jacket 2, carrying at the inside a longitudinal shaft 3, having at each end a journal 4 projecting from the opposite ends of an insert 5 provided at the inside of the jacket 2.

Each end of the jacket 2 is closed with a ring-like body 6 integrally fixed to the jacket and keyed in so as to be in contact with the inner surface 7 of the jacket 2. Each ring-like body is provided at the outer surface with a recess 8 with the bottom crossed by a through-hole 9. The latter receives rotatingly and with a radial clearance the journal 4 whose external surface is in contact with the inner ring of the radial ball bearing 10 keyed to the inside of the recess 8 for seating rotatingly the jacket 2 onto the inner shaft 3. One end of each journal 4 projects from the jacket 2 and thus forms a support for the pressure roller 1, while the outer end penetrates inside the jacket 2 and engages the inside of a hole 11 formed in the end walls 12 of the box-like structure 5, to which the journals 4 are now integrally fixed.

The box-like structure 5 comprises, in addition to the end walls 12 a back wall 13 perpendicular to the walls 12 and parallel to the axis of jacket 2. This wall 13 forms, together with the walls 12, a tub provided at the inside with an axial rib 14 running from one wall 12 to the other wall 12 and solidly connected perpendicular to the said walls 12 and 13.

Inside the tub there are two cylinder units 15 with pistons operated by fluid pressure. The bottom of the cylinder units is formed by the wall 13, with the cover-like closure of each cylinder unit being crossed by the piston rod 16 of the piston 17 running within the relative cylinder unit 15, that is the piston 17 is displaced with the corresponding cylinder unit 15 under the effect of a pressure liquid P fed to the cylinder chamber through a hole 18 provided in the wall 13. The cylinder units 15 are essentially radial to the jacket 2 more or less at the inside end of the corresponding journal 4.

The longitudinal rib 14, at the mid-point between the two cylinder units 15, is provided with a lip 19 projecting radially toward the jacket 2 from the free side of the said rib 14 opposite to wall 13.

This lip 19 is integrally connected with two pivots 20 seated perpendicular to the shaft 3. These pivots are symmetric and arranged mirror-like to the mid-point of the shaft. Each pivot 20 carries one end of a lever 21 essentially running parallel to the shaft 3, with the other free end of the lever contacting the respective free end of the corresponding piston rod 16.

Each lever 21 has an essentially round cross-section and is keyed into the inside ring of a radial ball bearing 22, whose outer ring is pressed by the piston rod 16 and the corresponding lever 21 against the inner surface 7 of the jacket 2.

When using the pressure roller 1 and it is desired to apply to the roller axis a given camber, pressure liquid is fed into the cylinder 15 for moving outward the piston rods 16.

The pressure fluid may be fed either directly into the cylinders 15 through the pressure tubes (P) (not shown) running through the journals 4 to the through holes 18, or, else, it may also be possible to pressurize the whole chamber defined by the jacket 2 and the ring bodies 6.

The increase in pressure inside the cylinders 15 corresponds to an outward displacement of the piston rods 16 and the rotation, always outward, of the levers 21, opposed elastically by the jacket 2 and rigidly by the shaft 3. The outward displacement of the ball bearings 22 is made possible by the outward deflection of the jacket 2 at its mid-part accompanied by the deflection in opposite direction of the shaft 3.

The above description clearly shows that an increase in pressure inside the cylinders 15 results in a given outward deflection of the axis of the jacket 2.

This deflection is proportional to the applied pressure and is automatically cancelled by the elastic return to their original position of the jacket 2 and the shaft 3 as soon as the applied pressure is cut off.

What I claim is:

1. A pressure roller having a variable shape, comprising:
   a central shaft having a central part;
   an outer cylindrical jacket having opposite ends rotatably mounted on said central shaft and having a longitudinal axis;
   actuator means, located within said outer jacket, for transmitting a deflecting force onto said axis of said outer jacket, said actuator means including a first lever pivotally coupled to said central part about a first pivot axis perpendicular to said longitudinal axis and including a first thrust means for applying pressure to said first lever in a direction radially outwardly of said outer jacket, said first lever extending substantially parallel to said shaft; and
   first bearing means, between said first lever and an inner surface of said outer jacket, for transmitting radially outwardly directed forces from said first lever to said outer jacket.

2. A pressure roller according to claim 1 wherein said actuator means comprises a second lever pivotally coupled to said central part about a second pivot axis perpendicular to said longitudinal axis and a second thrust means for applying pressure to said second lever in a direction radially outwardly of said outer jacket, said second lever extending substantially parallel to said shaft; and second bearing means connects said second lever to said inner surface of said outer jacket for transmitting radially outwardly directed forces from said second lever to said outer jacket.

3. A pressure roller according to claim 2 wherein said first and second levers extend from said first and second pivot axes, respectively, in opposite directions.

4. A pressure roller according to claim 2 wherein said first and second bearing means are mounted on and extend circumferentially about said first and second levers, respectively.

5. A pressure roller according to claim 1 wherein said first bearing means is mounted on and extends circumferentially about said first lever.

6. A pressure roller according to claim 2 wherein each of said bearing means comprises a radial ball bearing having an inner race coupled to the respective lever and an outer race in direct contact with said inner surface of said outer jacket.

7. A pressure roller according to claim 1 wherein said bearing means comprises a radial ball bearing having an inner race coupled to said lever and an outer race in direct contact with said inner surface of said outer jacket.

8. A pressure roller according to claim 6 wherein each of said thrust means comprises a fluid pressure operated piston-cylinder unit having a cylinder fixedly mounted in said central part and a piston extending substantially perpendicular to the respective lever.

9. A pressure roller according to claim 3 wherein each of said thrust means comprises a fluid pressure operated piston-cylinder unit having a cylinder fixedly mounted in said central part and a piston extending substantially perpendicular to the respective lever.

10. A pressure roller according to claim 9 wherein each of said thrust means contacts an end portion of the respective lever remote from the respective pivot axis.

11. A pressure roller according to claim 2 wherein each of said thrust means comprises a fluid pressure operated piston-cylinder unit having a cylinder fixedly mounted in said central part and a piston extending substantially perpendicular to the respective lever.

12. A pressure roller according to claim 1 wherein said thrust means comprises a fluid pressure operated piston-cylinder unit having a cylinder fixedly mounted in said central part and a piston extending substantially perpendicular to said lever.

13. A pressure roller according to claim 3 wherein each of said thrust means contacts an end portion of the respective lever remote from the pivot axis.

14. A pressure roller according to claim 1 wherein said thrust means contacts an end portion of said lever remote from said pivot axis; and said bearing means is axially between said end portion and said pivot axis.

* * * * *